Patented Apr. 7, 1942

2,278,868

UNITED STATES PATENT OFFICE 2,278,868

GLASS COLORS OF HIGH ALKALI RESISTANCE

Alden J. Deyrup, Elizabeth, N. J., assignor to E. I. du Pont de Nemours & Company, Wilmington, Del., a corporation of Delaware No Drawing. Application May 21, 1940, Serial No. 336,415

17 Claims. (Cl. 106—49)

This invention relates to the decoration of the surfaces of glass and ceramic ware by the use of low-melting glazes, which glazes may be pigmented and/or opacified. Although useful generally in the decoration of all types of ceramic surfaces, the invention is especially useful for the decoration of surfaces of articles of glassware.

The invention disclosed in this application is, in part, a continuation of that disclosed in my copending patent application Serial No. 141,188 filed May 6, 1937, now abandoned.

The surfaces of glass and ceramic articles are frequently decorated by melting thereon a glaze composition. This glaze composition is usually pigmented by the addition of a ceramic pigment, and may or may not also contain an opacifying agent. The glaze composition, which is also termed a "color" in this art, must be one which will melt and form an adherent coating at a temperature below that at which softening or deformation of the glass or ceramic article decorated would occur. It is in this special field of low-melting glaze or enamel compositions, melting to form a glossy adherent coating generally below 1150° F., particularly useful for the decoration of articles of glassware, that the novel compositions with which this invention is concerned find their principal utility.

The art of decorating glassware by the application thereto of a low-melting glaze composition, ordinarily known as a glaze or color, has been practiced for a number of years. Among the glaze compositions suitable, melting below about 1150° F., it has been customary to employ the silicates and the borosilicates of lead. These compositions ordinarily melt at temperatures below those at which danger of injury to the glass articles being decorated by softening or deformation would occur. They can therefore be utilized in the decoration of glassware surfaces by melting the glaze compositions thereon. The low-melting borosilicates of lead are ordinarily prepared by melting together an oxide of lead, boric acid and silica in such proportions as to yield a glaze composition having a suitably low melting point. The low-melting lead silicate glazes, which usually have somewhat higher melting points than the lead borosilicates, are usually prepared by melting together an oxide of lead and silica, in suitable proportions, together with an alkali metal oxide such as the oxides of sodium, potassium, or lithium.

While the presence of boron in the lead borosilicate glaze compositions, the boron usually being introduced as boric oxide or some compound yielding boric oxide during the melting such as boric acid, has been desirable from the point of view of lowering the melting point, its inclusion has resulted in a substantial lessening in the resistance to acids and alkalies of the glaze compositions and of the resulting glossy decorative surfaces. Various attempts have been made to secure glaze compositions which would possess satisfactory low melting points but would, nevertheless, have greater resistance to the action of chemical agents such as acids and alkalies. Generally, it has been necessary to sacrifice melting point in order to obtain increased resistance, the resistance of any glaze composition to chemical action ordinarily increasing as the fusion point of the composition increases. In order to obtain superior resistance to the action of chemical agents such as the alkalies, it has been necessary in the art to prepare compositions having relatively high melting points, the melting points in some instances being so high as to prevent or seriously restrict the utilization of the glaze compositions in the decoration of glassware surfaces. Glazes of relatively low melting point, such as some lead borosilicate glazes, on the other hand, are soluble to a substantial extent even in water.

Recently the decoration of glass milk bottles by the melting thereon of a low-melting glaze composition has been commercially practiced to a substantial extent. When glass milk bottles are returned to the dairy for further use it is customary to wash these bottles in a hot solution containing considerable quantities of caustic. This alkali has been injurious to the colored decoration on the milk bottles, the usual types of low-melting glazes not possessing sufficient resistance to the action of alkalies to render the useful life of the milk bottles more than that of a relatively few washings. In order to prolong the active life of these bottles, it has become increasingly evident that the colored decoration would have to be secured by the use of a glaze composition having greater resistance to the action of alkalies than those low-melting glazes now known to the art.

Increased resistance to chemical action, particularly to the action of alkalies, must be attained, however, without substantially elevating the melting point of the glaze composition applied to the glass bottles or other glassware. As previously specified, softening of most glassware articles occurs at temperatures around 1100° F., or even, in some cases, at temperatures below 1100° F. such as 1000° F. This means that for decorating most glassware surfaces the glaze compositions must possess fusion points not in excess of 1100° F. Glass milk bottles, because of their substantial thickness, may be regarded as an exception to this general rule, however, the softening temperature of such milk bottles being frequently in excess of 1100° F. Accordingly, my invention includes the preparation of compositions for decorating glassware which possess fusion points up to about 1150° F., as such decorating compositions can frequently be used in the decoration of some types of glassware such as glass milk bottles and other articles of relatively thick glass. As previously stated, the general resistance of a glaze for decorating glassware and of the resulting decoration on the glass article decorated increases as the fusion point of the glaze composition increases.

In my previously referred to copending patent application, Serial No. 141,188, now abandoned, I have disclosed low-melting lead glaze compositions of increased resistance to the action of alkaline agents which compositions contain lead oxide, silica, boric oxide, and zirconium oxide, the latter refractory oxide being melted into the glaze composition together with the other ingredients comprising the flux. The invention to which this application relates is an improvement over that disclosed in my copending patent application. The glazes with which this invention is concerned are also of increased resistance to the action of alkalies. They are compositions of low melting point which contain lead oxide, silica, boric oxide, one or more alkali metal oxides, and zirconium oxide, said zirconium oxide being melted into the flux composition. The glazes with which I am here concerned are therefore distinguished from those of Serial No. 141,188 in that they contain, in addition to boric oxide, one or more of the alkali metal oxides. I have now found that the inclusion of one or more of the alkali metal oxides, in addition to boric oxide, in glazes of the specified type results in the securement of certain improved properties not obtainable with the glaze compositions of my copending application. The improved glazes containing both boric oxide and an alkali metal oxide together possess markedly increased resistance to the action of alkalies over compositions containing boric oxide alone, and are also of increased resistivity to the action of alkaline agents over that characteristic of compositions which contain one or more of the alkali metal oxides but no boric oxide.

The improved compositions with which this invention is concerned are, moreover, less susceptible to reduction, darkening, or blistering by the carbonaceous residue of organic application media than are glazes of similar composition but containing only an alkali metal oxide and no boric oxide. This superior resistance to darkening is, of course, of considerable importance under circumstances wherein the glaze compositions are applied to articles of glassware to be decorated while suspended in an oily vehicle or medium, such as in the so-called "squeegee" process.

My improved low-melting glazes, of increased resistance to the action of alkalies, containing both boric oxide and one or more of the alkali metal oxides, are also more stable when pigmented to a red or orange color by the addition of cadmium sulfoselenide as a pigment than are the glaze compositions of my previously referred to copending patent application. It is known that the stability of lead-bearing fluxes to cadmium red pigments may be increased by introducing cadmium oxide as a melted-in constituent into the glaze composition. When equal amounts of cadmium oxide are present in glaze compositions containing only an alkali metal oxide, but no boric oxide, there is a definite tendency for the glaze, upon firing, to develop a brownish or blackish hue. Surprisingly enough, my improved glazes containing both an alkali metal oxide and boric oxide, with which this invention is concerned, remain bright when fired, and are more stable with red ceramic pigments than any glaze compositions previously available.

Since the resistance of glass enamels to the action of alkalies is of particular interest wherever glassware is cleansed by the action of strongly alkaline detergents at elevated temperatures, it is one object of this invention to prepare glass enamels which possess superior resistance to the action of alkaline agents. As previously explained, this superior resistance to the action of alkaline agents, such as solutions of caustic applied at fairly high temperatures, must be secured without elevating the fusion point of the glaze compositions to any substantial extent. It may therefore be stated that the principal object of this invention is the preparation of glaze compositions of superior resistance to the action of alkaline agents, which compositions will nevertheless possess fusion points sufficiently low to permit them to be utilized successfully in the decoration of glassware.

Still further objects of this invention involve the preparation of improved glazes, of markedly increased resistance to the action of alkalies, which glazes will be more stable to the cadmium sulfoselenide red and orange pigments than are compositions previously available such as those disclosed in my copending patent application Serial No. 141,188. Still other objects of the invention involve the adjustment of the various constituents comprising my improved flux so that the products will possess coefficients of expansion not too far different from that of the glassware article being decorated. These and still further objects of my invention will be apparent from the ensuing disclosure of certain preferred embodiments thereof.

The improved glazes of my previously referred to copending patent application are characterized by the presence of zirconium oxide, melted in with the lead silicate or lead borosilicate batch as an integral melted-in constituent of the frit composition. The glazes of this patent application are also characterized by the presence of melted-in zirconium oxide, but are further characterized by the fact that they contain both boric oxide and an oxide of one or more of the alkali metals such as the oxides of sodium, potassium, and lithium. It is, of course, remarkable that the highly refractory oxide, zirconium oxide, can be melted into low-melting glaze compositions of the type specified without increasing their maturing temperatures to such an extent as to render the resulting products worthless for the decoration of glassware. It is also remarkable that superior resistance to the action of alkalies is secured by having present in the glaze composition both boric oxide and one or more of the alkali metal oxides. Under these circumstances, that the resulting product not only possesses satisfactory expansion characteristics, but that the glaze is also more stable when cadmium sulfide or sulfoselenide is incorporated therein for the purpose of securing a red or orange color, is an unexpected and surprising discovery.

In preparing glaze compositions in accordance with my invention, it is possible to vary the composition within fairly wide limits. Various other constituents in addition to those specified may also be included in the flux composition. In order to secure maximum resistance of the glaze compositions to the action of alkaline agents, it is preferable to adjust the silica-to-lead ratio in such a manner as to secure the maximum fusion point consistent with the development of good gloss at the temperature at which the glaze is to be fired when maturing the composition on the ceramic article to be decorated. When the silica-to-lead oxide ratio has been adjusted in this manner, I have discovered that there exists an optimum content of boric oxide, which optimum quantity is dependent on the other constituents present in the flux composition and on the proportions in which they are present.

It has been found that an increase in the amount of zirconium oxide melted in as a constituent of the flux composition results in an increase in the resistance of the resulting glaze composition to the action of alkalies. However, an increase in the zirconium oxide content is limited in practice by the increased difficulty of melting the zirconium compounds in order to bring them into solution. I have discovered that an increase in alkali resistance can also be secured by increasing the alkali metal oxide content of the glaze, but the extent to which this can be done is limited by the fact that increased alkali metal oxide content results in higher coefficients of expansion. It is thus evident that by regulating both the amount of zirconium oxide, melted in as a constituent of the flux composition, and the total quantity of alkali metal oxides present, it is possible to produce a glaze composition of improved resistance to the action of alkalies, but one which will have a coefficient of expansion suitable to permit of its use for decorating glassware.

The alkali metal oxides which I prefer to employ are those of the alkali metals having an atomic weight below 40. This group includes the alkali metal oxides, lithium oxide, sodium oxide, and potassium oxide; the oxides of the metals lithium, sodium, and potassium, all of which have atomic weights below 40.

When glaze compositions are applied by melting them on the surfaces of glass articles, it is frequently necessary that the glass article possess the property of withstanding thermal shock. If the coefficient of expansion of the enamel is greater than that of the glassware article by more than a few percent, strains are set up by the decoration which result in weakening the glass to thermal and mechanical shock. It is therefore evident that control of the coefficient of expansion of the flux composition is essential.

When the silica-to-lead oxide ratio is adjusted to secure equal maturing temperatures, and the alkali metal oxide content is adjusted to secure equal coefficients of expansion, it has been found that lithium oxide is to be preferred to sodium oxide in my improved flux compositions. To secure maximum resistance to the action of alkalies, I have also found that sodium oxide is to be preferred to potassium oxide.

It is frequently desirable to employ a mixture of ingredients in the batch composition which yield in the melt a mixture of the alkali metal oxides. While lithium oxide is preferred to sodium oxide under conditions wherein the maximum resistance to the action of alkaline agents is necessary, I have found that lithium compounds tend to set up a small amount of strain in the decorated glassware article, even under circumstances wherein the coefficients of expansion of the enamel and of the glass are substantially identical. When complete freedom from strain is essential, I therefore prefer to employ a glaze composition containing an oxide of sodium.

My improved glaze compositions are particularly valuable for use under circumstances wherein they are colored to a reddish or orange shade by the use of cadmium red pigments. Where resistance to the action of acid as well as resistance to the action of alkaline agents is requisite, the flux may also contain titanium dioxide, included as a melted-in constituent of the flux composition. The use of titanium dioxide for improving the resistance of low-melting glaze compositions to the action of acids is disclosed and claimed in my copending patent applications Ser. No. 132,660 filed March 23, 1937, now Patent No. 2,225,161, issued December 17, 1940, and Ser. No. 248,039 filed December 28, 1938, which application has now become abandoned.

Table I summarizes the constituents which should be present in my improved glaze compositions and the ranges in which those constituents should be present under circumstances where maximum resistance to the action of alkaline agents is essential. These compositions are satisfactory and give improved decorative coatings where increased weakening to thermal shock is not considered serious. They are particularly valuable where the colors are to be used as very thinly applied coatings, under which circumstances increased thermal shock is not objectionable.

TABLE I

*Composition of improved low-melting glaze compositions of highly superior resistivity to the action of alkaline agents*

| | Per cent |
|---|---|
| Lead oxide | 40–60 |
| Silica | 20–30 |
| Boric oxide | 2–15 |
| Sodium oxide | 0– 5 |
| Lithium oxide | 0– 3 |
| Potassium oxide | 0– 8 |
| Zirconium oxide | 1–10 |

The total content of alkali metal oxides should not be less than 0.5% nor greater than 10%.

All percentages are by weight, based on the total weight of the composition.

However, where increased weakening to thermal and mechanical shock is objectionable, it is desirable to utilize flux compositions falling within the limits of those specified in Table II. Under these circumstances slightly lowered resistance to the action of alkaline agents results, but this adjustment is necessary in order to secure flux compositions which may be applied to glassware without any risk of weakening the resistance of the decorated article to thermal or mechanical shock.

TABLE II

*Composition of improved low-melting glazes of superior resistance to the action of alkalies which may be applied to glassware articles without increasing the tendency to thermal or mechanical shock*

| | Per cent |
|---|---|
| Lead oxide | 40–60 |
| Silica | 20–30 |
| Boric oxide | 2–10 |
| Sodium oxide | 0– 5 |
| Lithium oxide | 0– 1.5 |
| Potassium oxide | 0– 6 |
| Zirconium oxide | 1–10 |

The total content of alkali metal oxides should not be less than 0.5% nor more than 6%.

All percentages are by weight, based on the total weight of the composition.

As examples of batch compositions which may be melted to produce my improved glaze compositions, Table III lists the various constituents and the amounts which should be present in various batch compositions. In this table all parts are by weight. It should be understood, of course, that I am not limited to these ingredients as sources of the various oxides present in my improved glazes, but may utilize other compounds which, when melted, will yield the desired oxides.

TABLE III

*Batch compositions*

| | Batch 1 | Batch 2 | Batch 3 | Batch 4 | Batch 5 | Batch 6 |
|---|---|---|---|---|---|---|
| Red lead ($Pb_3O_4$) | 46.6 | 48.8 | 58.6 | 42.0 | 46.8 | 54.4 |
| Flint ($SiO_2$) | 23.1 | 22.2 | 7.7 | 6.4 | 25.3 | 24.0 |
| Boric acid ($H_3BO_3$) | 9.7 | 10.1 | 12.2 | 17.6 | 9.7 | 4.0 |
| Sodium carbonate ($Na_2CO_3$) | 6.2 | | | | 6.2 | 8.0 |
| Sodium silicate (23.5% $Na_2O$, 76.5% $SiO_2$) | | | 8.3 | 10.0 | | |
| Lithium carbonate ($Li_2CO_3$) | | 2.8 | | 1.6 | | |
| Sodium zirconium silicate (14% $Na_2O$, 29% $SiO_2$, 55% $ZrO_2$) | 7.0 | 7.4 | 11.0 | 11.2 | 7.1 | |
| Titanium oxide ($TiO_2$) | 2.6 | 3.7 | 2.2 | 4.8 | | 3.2 |
| Cadmium carbonate ($CdCO_3$) | | | | | | 3.2 |
| Cadmium oxide (CdO) | 3.1 | 3.2 | | 3.2 | 3.1 | |
| Ammonium phosphate (($NH_4$)$_2HPO_4$) | | | | 3.2 | | |
| Zinc oxide (ZnO) | 1.7 | 1.8 | | | 1.8 | |
| Zirconium oxide ($ZrO_2$) | | | | | | 3.2 |

When melted, these batch compositions will result in fluxes having the calculated compositions specified in Table IV. These percentages are by weight, based on the total weight of the flux.

TABLE IV

*Calculated melted flux compositions produced by melting the batches specified in Table III*

| | Glaze 1 | Glaze 2 | Glaze 3 | Glaze 4 | Glaze 5 | Glaze 6 |
|---|---|---|---|---|---|---|
| PbO | 49.5 | 51.4 | 61.4 | 46.3 | 49.7 | 57.2 |
| $SiO_2$ | 27.3 | 26.3 | 18.5 | 19.5 | 29.7 | 25.9 |
| $B_2O_3$ | 6.0 | 6.2 | 7.4 | 11.2 | 6.0 | 2.4 |
| $ZrO_2$ | 4.2 | 4.4 | 6.5 | 7.0 | 4.2 | 3.4 |
| $Na_2O$ | 5.0 | 1.1 | 3.8 | 4.4 | 5.0 | 5.0 |
| $Li_2O$ | | 1.2 | | 0.8 | | |
| $TiO_2$ | 2.8 | 4.0 | 2.4 | 5.4 | | 3.5 |
| CdO | 3.4 | 3.5 | | 3.6 | 3.4 | 2.6 |
| ZnO | 1.8 | 1.9 | | | 2.0 | |
| $P_2O_5$ | | | | 1.8 | | |

The compositions in Table IV may be prepared in the manner usual in this art by melting the batches of Table III and pouring the molten products into water to obtain finely divided frits. Although no rigid specifications of melting time and temperature are required in the practice of my invention, it is necessary to conduct the melting under conditions such that a substantial part, preferably all, of the zirconium compounds dissolve in the melt. Although undissolved zirconium compounds are not necessarily detrimental, the undissolved portion suspended in the melt serves only as an opacifier and does not augment the alkali resistance, which is one of the objects of my invention. Accordingly, I prefer to conduct the melting, not merely to a homogeneous opaque fusion, but further until proofs taken from the melt appear substantially clear and transparent.

The resulting enamel compositions may be pigmented by any of the usual ceramic pigments. Thus, 90 parts of a flux such as glaze 2 of Table IV may be milled in the manner usual in this art to a fine state of subdivision with any red cadmium sulfoselenide pigment. When applied to the ceramic ware to be decorated and fired, a bright red decoration will result. When an enamel similar to that of glaze 2 is prepared but containing no boron, satisfactory bright red shades cannot be obtained, the decorated article usually having a brownish or blackish cast.

Of course any suitable pigmentary materials can be used for pigmenting my improved flux compositions. Thus, a blue pigment such as cobalt aluminate can be added by milling with the fritted composition, producing a pigmented glaze composition which will be found to yield a more resistant bright blue decorative coating than that obtainable with the same pigment utilizing a similar flux composition but one containing no alkali metal oxide. In addition, my improved glazes may contain, of course, the usual opacifying agents, addition agents, and other ingredients normally present in colored and opacified enamels which are applied to glassware articles.

To those skilled in the art, many modifications and widely different embodiments of my invention in the general field of decorating ceramic articles will be readily suggested. For this reason, the invention is not to be restricted to the precise proportions, procedures, or conditions given herein as illustrative of my preferred embodiments, but its scope is to be construed in accordance with the prior art and appended claims.

I claim:

1. An alkali-resistant, high lead content glaze composition suitable for decorating glassware and maturing below about 1150° F. to a glossy, decorative surface coating, said glaze composition comprising lead oxide, silica, an oxide of an alkali metal having an atomic weight not exceeding 40, boric oxide, and zirconium dioxide; said zirconium dioxide being present in amounts ranging from 1 to 10% by weight, based on the total weight of said composition, and being melted into said composition together with the other ingredients specified.

2. An alkali-resistant, high lead content glaze composition suitable for decorating glassware and maturing below about 1150° F. to a glossy, decorative surface coating, said glaze composition comprising lead oxide, silica, boric oxide, sodium oxide, and zirconium dioxide; said zirconium dioxide being present in amounts ranging from 1 to 10% by weight, based on the total weight of said glaze composition, and being melted into said glaze composition together with the other ingredients thereof.

3. An alkali-resistant, high lead content glaze composition suitable for decorating glassware and maturing below about 1150° F. to a glossy, decorative surface coating, said glaze composition comprising lead oxide, silica, at least one of the oxides of an alkali metal having an atomic weight below 40, boric oxide, and zirconium dioxide; said zirconium dioxide being melted into said glaze composition together with the other ingredients thereof.

4. An alkali-resistant, high lead content glaze composition suitable for decorating glassware and maturing below about 1150° F. to a glossy, decorative surface coating, said glaze composition comprising lead oxide, silica, boric oxide, lithium oxide, and zirconium dioxide; said zirconium dioxide being present in amounts ranging from 1 to 10% by weight, based on the total weight of said glaze composition, and being melted into said glaze composition together with the other ingredients thereof.

5. An alkali-resistant, high lead content glaze composition suitable for decorating glassware and maturing below about 1150° F. to a glossy, decorative surface coating, said glaze composition comprising lead oxide, silica, boric oxide, potassium oxide, and zirconium oxide; said zirconium oxide being melted into said glaze composition with the other ingredients thereof and being present in amounts ranging from 1 to 10% by weight, based on the total weight of said glaze composition.

6. An alkali-resistant, high lead content glaze composition suitable for decorating glassware and maturing below about 1150° F. to a glossy, decorative surface coating, said glaze composition comprising lead oxide present in amounts equal to at least 40% by weight of the total weight of said glaze composition; silica; boric oxide; zirconium dioxide; and at least one of the oxides of an alkali metal having an atomic weight below 40; said zirconium dioxide being present in amounts ranging from 1 to 10% by weight, based on the total weight of said glaze composition and being melted into said glaze composition together with the other ingredients thereof; and the total content of alkali metal oxide present in said glaze composition falling within the range 0.5 to 10% by weight of the total weight of said glaze composition.

7. An alkali-resistant glaze composition for decorating glassware having a maturing temperature below about 1150° F. and maturing to a glossy, decorative surface coating, which glaze composition comprises lead oxide present in amounts ranging from 40 to 60% by weight of said total glaze composition; silica; boric oxide; at least one of the oxides of an alkali metal having an atomic weight below 40; and zirconium dioxide; said zirconium dioxide being present in amounts ranging from 1 to 10% by weight, based on the total weight of said glaze composition, and being melted into said glaze composition with the other ingredients comprising said composition; the total quantity of alkali metal oxide present falling within the range 0.5% to 10% by weight of the total weight of said glaze composition.

8. An alkali-resistant glaze composition for decorating glassware maturing below about 1150° F. to a glossy, decorative surface coating, which glaze composition comprises lead oxide present in amounts equal to at least 40% by weight of the total weight of said glaze composition; silica; boric oxide; at least one of the oxides of an alkali metal having an atomic weight below 40; and zirconium dioxide; said zirconium dioxide being present in amounts ranging from 1 to 10% by weight, based on the total weight of said glaze composition, and being melted into said glaze composition together with the other ingredients thereof; the total quantity of alkali metal oxide present being not less than 0.5% nor greater than 6% of the total weight of said glaze composition.

9. An alkali-resistant glaze composition for decorating glassware maturing below about 1150° F. to a glossy, decorative surface coating, which glaze composition comprises lead oxide present in amounts ranging from 40 to 60%; silica present in amounts ranging from 20 to 30%; boric oxide present in amounts ranging from 2 to 15%; zirconium dioxide present in amounts ranging from 1 to 10%; and at least one of the oxides of an alkali metal having an atomic weight below 40; said zirconium dioxide being melted into said glaze composition together with the other ingredients thereof; said total content of alkali metal oxide being not less than 0.5% nor greater than 10%; sodium oxide, when present, not exceeding a content of 5%; lithium oxide, when present, not exceeding a content of 3%; and potassium oxide, when present, not exceeding a content of 8%; all said percentages being by weight, based on the total weight of said glaze composition.

10. An alkali-resistant, high lead content glaze composition suitable for decorating glassware and maturing below about 1150° F. to a glossy, decorative surface coating, said glaze composition comprising lead oxide present in amounts ranging from 40 to 60%; silica present in amounts ranging from 20 to 30%; boric oxide present in amounts ranging from 2 to 10%; zirconium dioxide present in amounts ranging from 1 to 10%; and at least one of the oxides of an alkali metal having an atomic weight below 40; said zirconium dioxide being melted into said glaze composition together with the other ingredients thereof; the total quantity of alkali metal oxide present being not less than 0.5% nor greater than 6%; sodium oxide, when present, being present in amounts not greater than 5%; lithium oxide, when present, being present in amounts not greater than 1.5%; and potassium oxide, when present, being present in amounts not exceeding 6%; all said percentages being by weight, based on the total weight of said glaze composition.

11. A pigmented alkali-resistant, high lead content glaze composition suitable for decorating glassware and maturing below about 1150° F. to a glossy, decorative surface coating, which composition comprises a ceramic pigment, and a lead frit comprising lead oxide, silica, boric oxide, at least one of the oxides of an alkali metal having an atomic weight below 40, and zirconium dioxide; said zirconium dioxide being present in amounts ranging from 1 to 10% by weight, based on the total weight of said frit, and being melted into said frit composition together with the other ingredients thereof.

12. A pigmented alkali-resistant, high lead content glaze composition suitable for decorating glassware and maturing below about 1150° F. to a glossy, decorative surface coating, said glaze composition comprising cadmium sulfoselenide ceramic pigment and a lead frit; said lead frit comprising lead oxide, silica, boric oxide, at least one of the oxides of an alkali metal having an atomic weight below 40, and zirconium dioxide; said zirconium dioxide being present in amounts ranging from 1 to 10% by weight and constituting a melted-in ingredient of said frit composition.

13. A pigmented alkali-resistant, high lead content glaze composition suitable for decorating glassware and maturing below about 1150° F. to a glossy, decorative surface coating, said glaze composition comprising a cadmium red ceramic pigment and a lead frit, said lead frit comprising lead oxide, cadmium oxide, silica, boric oxide, at least one of the oxides of an alkali metal having an atomic weight below 40, and zirconium dioxide; said zirconium dioxide being present in amounts ranging from 1 to 10% by weight and constituting a melted-in ingredient of said frit composition.

14. A glassware article decorated on the surface portions thereof with an alkali-resistant, high lead content glaze composition suitable for decorating glassware and maturing below about 1150° F. to a glossy, decorative surface coating, said glaze composition comprising lead oxide, silica, boric oxide, at least one of the oxides of an alkali metal having an atomic weight below 40, and zirconium dioxide; said zirconium dioxide being preesnt in amounts ranging from 1 to 10% by weight, based on the total weight of said glaze composition, and being melted into said composition together with the other ingredients thereof.

15. A decorated glassware article provided on the surface portions thereof with a pigmented alkali-resistant, high lead content glaze composition of the type suitable for decorating glassware maturing below about 1150° F. to a glossy, decorative surface coating, said glaze composition comprising a ceramic pigment and a lead frit composition; said lead frit composition comprising lead oxide, silica, boric oxide, at least one of the oxides of an alkali metal having an atomic weight below 40, and zirconium dioxide; said zirconium dioxide being present in amounts ranging from 1 to 10% by weight, based on the total weight of said frit composition and being melted into said frit composition together with the other ingredients thereof.

16. An opaque, alkali-resistant, high lead content glaze composition suitable for decorating glassware and maturing below about 1150° F. to a glossy, decorative surface coating, which composition comprises an opacifying agent and a lead frit comprising lead oxide, silica, boric oxide, at least one of the oxides of an alkali metal having an atomic weight below 40, and zirconium dioxide, said zirconium dioxide being present in amounts ranging from 1 to 10% by weight, based on the total weight of said frit, and being melted into said frit composition together with the other ingredients thereof.

17. An alkali-resistant, high lead content glaze composition suitable for decorating glassware and maturing below about 1150° F. to a glossy, decorative surface coating, said glaze composition comprising lead oxide present in amounts equal to at least 40% by weight of the total weight of said glaze composition; silica; boric oxide; and zirconium dioxide, said zirconium dioxide being present in amounts ranging from 1 to 10% by weight, based on the total weight of said glaze composition, and being melted into said glaze composition together with the other ingredients thereof.

ALDEN J. DEYRUP.

DISCLAIMER 2,278,868.—*Alden J. Deyrup*, Elizabeth, N. J. GLASS COLORS OF HIGH ALKALI RESISTANCE. Patent dated April 7, 1942. Disclaimer filed April 13, 1944, by the assignee, *E. I. du Pont de Nemours and Company*.

Hereby enters this disclaimer to claim 17 of said Letters Patent.

[*Official Gazette May 16, 1944.*]